Figure 5:
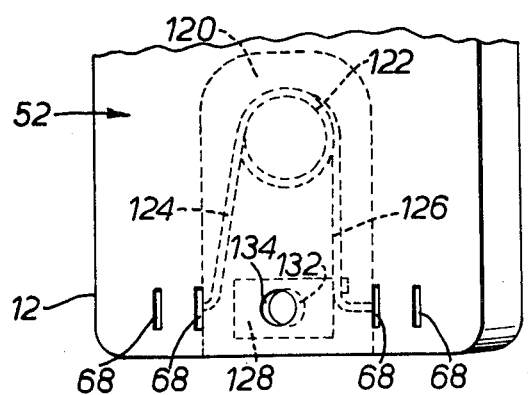

United States Patent [19]
Currall

[11] Patent Number: 4,486,060
[45] Date of Patent: Dec. 4, 1984

[54] CONNECTOR ARRANGEMENTS

[75] Inventor: William J. P. Currall, Swindon, England

[73] Assignee: Plessey Overseas Limited, Ilford, England

[21] Appl. No.: 434,421

[22] Filed: Oct. 14, 1982

[30] Foreign Application Priority Data

Oct. 15, 1981 [GB] United Kingdom ............... 81/31138
Oct. 15, 1981 [GB] United Kingdom ............... 81/31139
Oct. 15, 1981 [GB] United Kingdom ............... 81/31140

[51] Int. Cl.³ ............................................. H01R 4/64
[52] U.S. Cl. .................................... 339/15; 137/560; 137/614.05
[58] Field of Search ............... 339/15, 16 R; 137/560, 137/614.05, 614.04; 285/119, 133 R, 133 A

[56] References Cited

U.S. PATENT DOCUMENTS 3,482,602 12/1909 Jarnagan et al. ........... 137/614.05 X
3,800,826 4/1974 McCann ............................. 137/560
4,084,614 4/1978 Ekman ....................... 137/614.04 X Primary Examiner—Eugene F. Desmond
Attorney, Agent, or Firm—Fleit, Jacobson, Cohn & Price

[57] ABSTRACT

The invention relates to a connector arrangement for connecting two liquid supply ducts and at least two electrical leads. The connector arrangement comprises two abuttable bodies each having attachment means to a liquid supply duct and connections to the electrical leads and including a valve to close the liquid supply ducts. The electrical connection is made by an elongate conductor on one body entering a socket in the other body, this connection being made before the possibility of arcing between the electrical connections igniting the liquid.

18 Claims, 7 Drawing Figures

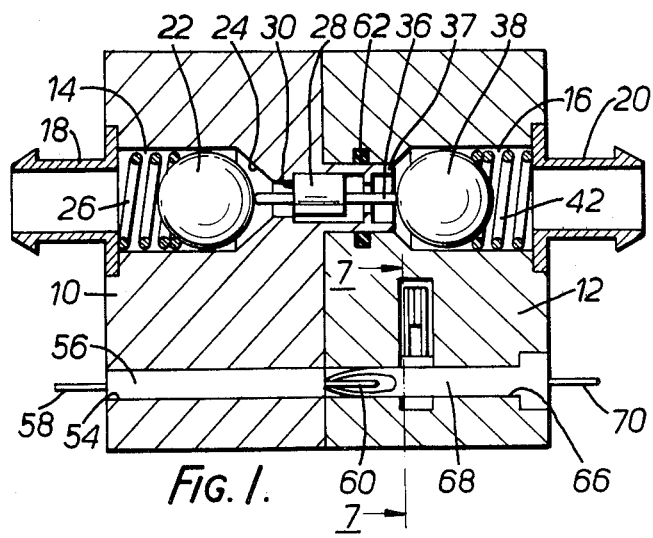
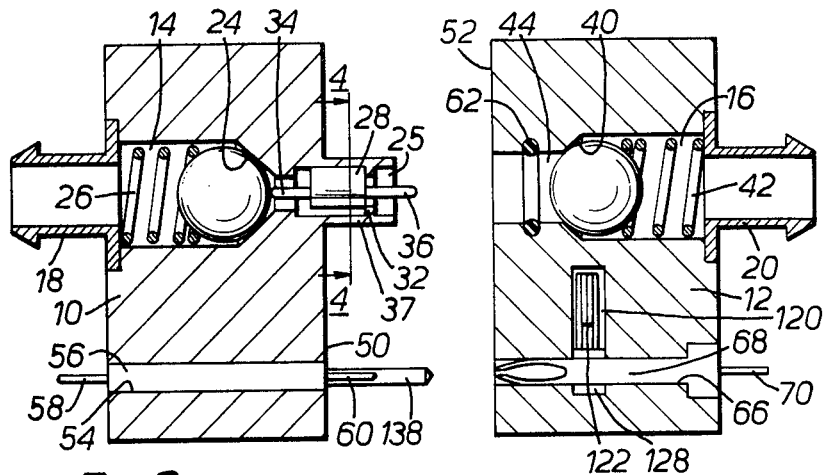
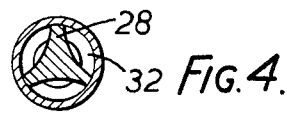

CONNECTOR ARRANGEMENTS

This invention relates to connector arrangements and more particularly to connector arrangements for connecting fluid flow lines and electrical leads in a single connecting assembly.

Quite often fluid flow apparatus includes electrically powered parts and/or electrical detectors for detecting the state of the fluid flow apparatus and information is fed back to the fluid supply and control system so that appropriate adjustments can be made by the control system. If the fluid flow apparatus is located remotely from the supply and control system long fluid supply lines and long electrical leads are required, necessitating a number of connections in the system. It is convenient if these connections can include both the fluid supply lines and the electrical leads and it is an object of the present invention therefore to provide a connector arrangement which will achieve this.

According to the present invention a connector arrangement for connecting two fluid supply lines and two electrical leads comprises first and second abuttable bodies, each body having a fluid duct which is adapted to be connected to one of the fluid supply lines and an electrical conductor which is adapted to be connected to one of the electrical leads each body including means for closing off the end of each fluid duct, the first body having a projecting portion adapted to project into an orifice formed in the second body to connect the two fluid ducts, one of the bodies having a projecting electrically conductive portion extending from its electrical conductor and adapted to project into a orifice formed in the other body to connect the two electrical conductors, the electrical conductors connecting before the fluid ducts connect.

Sealing means is preferably provided in the orifice in the second body comprising resilient means adapted to sealingly grip the outer periphery of the projecting portion.

Preferably the first body is provided with an elongate electrical conductive strip which projects from the abutting side of the body, and the second body is provided with an electrically conductive socket located in the orifice formed in the second body adapted to receive the strip.

The first and second bodies may be provided with a plurality of electrical conductors.

Preferably the projecting portion and the projecting electrically conductive portions are provided on the first body.

The means for closing off the end of each fluid supply line preferably comprises a one-way valve located in the end of each duct to prevent fluid from flowing out of each duct and valve actuating means located between the two one-way valves when the ducts are connected, the valve actuating means engaging both of the one-way valves whereby they are both opened to permit fluid to flow from one duct to the other duct.

Preferably at least one of the one-way valves comprises a ball valve in which the ball is urged towards a seating adjacent to the end of the duct. Both one way valves may comprise ball valves.

The valve actuating means may comprise a projection secured adjacent to the end of each duct which is adapted to displace the one-way valve in the other duct when the ducts are connected. Alternatively a single movable member may be located inside the end of one of the ducts which is adapted to displace both of the one-way valves when the two ducts are connected. In this case one of the one-way valves preferably has a lower spring rate than the other whereby one of the one-way valves is opened before the other.

Preferably stop means are provided for the movable member whereby the degree of displacement of the one-way valve with the lower spring rate is restricted and the one-way valve with the higher spring rate is then displaced by the movable member. When a plurality of electrical conductors are provided in the first and second bodies switch means may be incorporated in at least one of the bodies and means for operating the switch means is incorporated in the other body whereby when the two bodies are not joined two electrical conductors in at least one of the bodies are electrically connected, and when the two bodies are joined the electrical conductors in at least one of the bodies are not electrically connected.

Preferably there are two electrical conductors extending through each body for mutual connection when the two bodies are joined and the two conductors in the second body are electrically disconnected when the two bodies are joined and electrically connected when the two bodies are not joined.

Alternatively, there may be a plurality of electrical conductors in the second body, the first and second being electrically connected when the two bodies are not joined and any other combination of conductors being electrically connected when the two bodies are joined.

The switch means may comprise a movable electrically conductive strip.

Preferably the movable electrically conductive strip is supported by a movable member included in the second body.

The movable member is preferably moved by cam means formed on the first body.

The cam means may comprise a projection.

Preferably the second body and the movable member are provided with holes, in one position of the movable member the holes being in alignment and in another position of the movable member the holes being out of alignment.

Preferably the movable member is urged by spring means to move the holes out of alignment. The spring means may comprise the electrically conductive strip.

The projection is preferably adapted to enter the holes in the second body and in the movable member to bring them into alignment.

Figure 6:
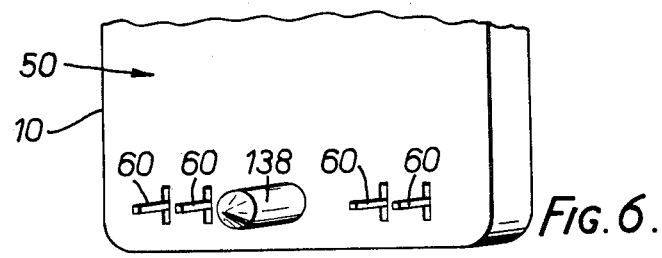
Figure 7:
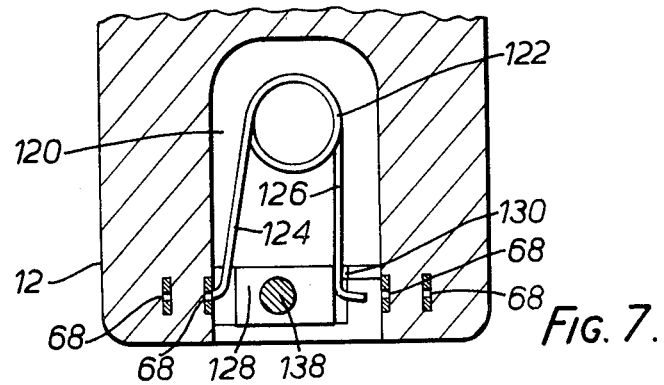

Embodiments of the invention will now be described by way of example only with reference to the accompanying drawings in which:

FIG. 1 is a cross-sectional view through an assembled connector arrangement according to the invention, FIG. 2 is a cross-sectional view of the first part of the connector arrangement, FIG. 3 is a cross-sectional view of the second part of the connector arrangement, FIG. 4 is a cross-sectional view taken along the line 4—4 in FIG. 2, FIG. 5 is a fragmentary end view of the second part of the connector arrangement, FIG. 6 is a fragmentary end view of the first part of the connector arrangement and, FIG. 7 is a cross-sectional view taken along line 7—7 in FIG. 3.

The connector arrangement comprises two bodies 10 and 12 which are adapted to abut along their faces 50 and 52 and be secured together.

The first body 10 is provided with a hole 14 which extends through the body, at the end of which is a projecting duct portion 37 from the face 50.

The other end is provided with a typical stub pipe 18 suitable for receiving a flexible fluid hose (not shown). A number of smaller holes 54 is also provided, in this case four, in each of which is fitted an elongate electrically conductive strip 56. One end 58 of each strip projects from the body 10 so as to be readily connectable to an electrical conductor (not shown) whilst the other end 60 projects from the face 50.

The second body 12 is also provided with a hole 16 which extends through the body and is provided with stub pipe 20 for a flexible fluid hose (not shown). Four further holes 66 are provided in each of which is located an electrical socket 68 having an elongate strip portion 70 extending out of the body 12 for connection to an electrical conductor (not shown).

The end 44 of the hole 16 is adapted to receive the duct portion 37 and a sealing ring 62 is located in the end 44 so as to make a sealed joint with the duct portion 37. Similarly the sockets 68 are adapted to receive the ends 60 of the strips 56 and the two bodies can be pushed together until the faces 50 and 52 abut. Any suitable method may be used to secure the two bodies together. To prevent the possibility of any danger if the fluid passing through the holes 14 and 16 is flammable, the ends 60 of the strips 56 contact the sockets 68 before the fluid can pass between the holes 14 and 16 so that any arcing between the electrical connectors cannot ignite the fluid.

In the duct 14 formed through the body 10 is located a ball 22 which is urged towards a conical seat 24 by a spring 26. Between the seat 24 and the open end 25 of the duct, the diameter of the duct is reduced, and movably mounted in this portion is a valve actuator 28, movement of which is restricted by two shoulders 30, 32 formed inside the duct 14. Extending from each end of the valve actuator 28 is a stem 34, 36. The end 25 of the duct 14 extends through a cylindrical projecting portion 37 of the body 10.

When the bodies 10 and 12 are not abutting and the ducts are not connected, the body 10 adopts the arrangement shown in FIG. 2 with the ball 22 abutting the seat 24, and the valve actuator 28 urged by the ball 22 towards the shoulder 32. It will be seen that no liquid can flow from left to right and out of the end 25 of the duct 14 in this position.

The body 12 is also provided with a ball 38 which is urged towards a conical seat 40 by a spring 42, the end 44 of the duct 16 having a diameter which will accept the projecting portion 37 of the body 10. As shown in FIG. 3 no flow of liquid can take place from right to left through the duct 16 in this position.

When the two bodies 10 and 12 are pushed together the projecting portion 37 enters the end 44 of the duct 16 and the stem 36 contacts the ball 38. The spring 42 has a higher rate than the spring 26 and the valve actuator 28 is thus moved within the duct 14 until the stem 34 contacts the ball 22 and displaces it from the seat 24. The valve actuator 28 eventually reaches the shoulder 30 and as the two bodies are urged together the stem 36 displaces the ball 38 from its seat 40. Thus when the bodies 10 and 12 are abutting as shown in FIG. 1, both of the one-way valves are open and liquid can flow in either direction between the ducts 14 and 16.

The body 12 is connected to a liquid supply system so that when the bodies are pushed together the liquid flows from right to left in FIG. 1. By making the ball 22 move first in the liquid receiving body 10 the possibility of leakage is reduced. The valve actuator 28 is shaped as shown in FIG. 4 to enable the liquid to flow freely past it.

Various modifications may be made to the valve means without departing from the scope of the invention. Thus for example instead of the movable actuator 28 a suitable projection could be provided in the body 12 which would extend into the duct 14 and displace the ball 22. Similarly a projection extending from the body 10 could be used to displace the ball 38. As before, the ball 22 could be displaced first by suitably arranging the lengths of the projections. Also instead of the shoulders 30 and 32 suitable stops could be provided behind the balls 22 and 38 to restrict their movement.

Mounted in a recess 120 in the second body 12 is a hairspring 122 having extended legs 124 and 126 which are urged into contact with two of the conductors 68. A movable plate 128 also located in the recess 120 is provided with a lug 130 which engages the leg 126 and the plate 128 is thus urged by the leg 126 into the position shown in FIG. 5. A hole 132 is formed through the plate 128 and a hole 134 is also formed in the body 12, the two holes being out of alignment when the plate 128 is in the position shown in FIG. 5.

The first body 10 is provided with four conductors 60 which project from the face 50 and have the same spacing as the conductors 68 formed in the second body 12. A tapered projection 138 extends from the face 16 of the body 10.

When the two bodies 10 and 12 of the connector are brought together so that their faces 50 and 52 are in contact, the projecting conductors 60 enter the socket shaped conductors 68, and the tapered projection 138 enters the hole 134. The projection 138 also enters the hole 132 formed in the plate 128, aligning the two holes and sliding the plate 128 into the position shown in FIG. 7. In this position the lug 130 has pulled the leg 126 out of contact with the conductor 68. When the two bodies are separated, the plate 128 can return under the action of the leg 126 to its original position in which the leg 126 contacts the conductor 68.

It will be seen that when the connector is incorporated in an electrical circuit the leads attached to the conductors 68 will be bridged by the hairspring 122 when the two bodies are not joined, and the leads will only be connected to the conductors 60 when the two bodies are joined. Thus contact between the two leads is automatically made when the two bodies are separated.

Various modification can be made to the action of the connector without departing from the scope of the invention. Thus, for example, by using two plates 128, one connected to both legs 124 and 126, both of the legs could be made to move out of contact with a conductor 68 completely isolating the hairspring 122 when the two bodies are joined. Also by suitably locating the other conductors 68 either or both of the legs 124 and 126 could be made to move into contact with other conductors when the two bodies are joined.

I claim:

1. A connector arrangement for connecting two fluid supply lines and two electrical leads comprising first and second abuttable bodies, each body having a fluid duct adapted to be connected to one of the fluid supply lines and an electrical conductor adapted to be connected to one of the electrical leads, each body including means for closing off the end of each fluid supply duct, the second body defining an orifice, the first body having a projecting portion adapted to project into the orifice formed in the second body to connect the two fluid ducts, one of the bodies having a projecting electrically conductive portion extending from its electrical conductor and the projecting electrically conductive portion adapted to project into an orifice formed in the other body to connect the two electrical conductors, the electrical conductors being connected before the fluid ducts connect, the means for closing off the end of each fluid duct comprises a one-way valve located in the end of each duct to prevent fluid from flowing out of each duct and valve actuating means located in at least one of the ducts, the valve actuating means causing both of the one-way valves to open when the ducts are connected to permit fluid to flow from one duct to the other duct, a single movable member is located inside the end of one of the ducts, the single movable member is adapted to displace both of the one-way valves when the two ducts are connected, switch means incorporated in at least one of the bodies and means for operating the switch means incorporated in the other body whereby when the two bodies are not joined, two electrical conductors in at least one of the bodies are electrically connected, and when the two bodies are joined, the electrical conductors in at least one of the bodies are not electrically connected.

2. A connector arrangement as claimed in claim 1 wherein sealing means provided in the orifice in the second body comprises resilient means adapted to sealingly grip the outer periphery of the projecting portion.

3. A connector arrangement as claimed in claim 1 in which the first and second bodies are provided with a plurality of electrical conductors.

4. A connector arrangement as claimed in claim 1 wherein at least one of the one-way valves comprises a ball valve having a ball and a seating wherein the ball is urged towards the seating positioned adjacent the end of the duct.

5. A connector arrangement as claimed in claim 1 wherein the valve actuating means comprises a projection secured adjacent to the end of one duct adapted to displace the one-way valve in the other duct when the ducts are connected.

6. A connector arrangement as claimed in claim 1 further comprising two electrical conductors extending through each body for mutual connection when the two bodies are joined and the two conductors in the second body are electrically connected together when the two bodies are not joined and electrically disconnected when the two bodies are joined.

7. A connector arrangement as claimed in claim 1 wherein the first body is provided with an elongate electrical conductive strip projecting from the abutting side of the body, and the second body is provided with an electrically conductive socket located in the orifice formed in the second body adapted to receive the strip.

8. A connector arrangement as claimed in claim 7 wherein the projecting portion and the projecting electrically conductive portion are provided on the first body.

9. A connector arrangement as claimed in claim 1 wherein the one-way valves include a spring means and one of the one-way valves has a lower spring rate than the other whereby one of the one-way valves is opened before the other.

10. A connector arrangement as claimed in claim 9 wherein stop means are provided for the movable member whereby the degree of displacement of the one-way valve with the lower spring rate is restricted and the one-way valve with the higher spring rate is then displaced by the movable member.

11. A connector arrangement as claimed in claim 1 wherein the switch means comprises a movable electrically conductive strip.

12. A connector arrangement as claimed in claim 11 wherein the movable electrically conductive strip is supported by a movable plate included in the second body.

13. A connector arrangement as claimed in claim 12 wherein the movable plate is moved by cam means formed on the first body.

14. A connector arrangement as claimed in claim 13 wherein the cam means comprises a projection.

15. A connector arrangement as claimed in claim 13 wherein the second body and the movable plate are provided with holes, in one position of the movable plate the holes being in alignment and in another position of the movable plate the holes being out of alignment.

16. A connector arrangement as claimed in claim 15 wherein the projection is adapted to enter the holes in the second body and in the movable plate to bring them into alignment.

17. A connector arrangement as claimed in claim 15 wherein the movable plate is urged by spring means to move the holes out of alignment.

18. A connector arrangement as claimed in claim 17 wherein the spring means comprise the electrically conductive strip.

* * * * *